United States Patent

Thiermann

[19]

[11] Patent Number: 5,921,832
[45] Date of Patent: Jul. 13, 1999

[54] INFLATION VALVE

[75] Inventor: Fritz G. Thiermann, River Edge, N.J.

[73] Assignee: General Pneumatics Corporation, Orange, N.J.

[21] Appl. No.: 08/706,498

[22] Filed: Sep. 5, 1996

[51] Int. Cl.[6] .................................................. B63C 9/18
[52] U.S. Cl. ............................................. 441/41; 441/96
[58] Field of Search .............................. 441/41, 92, 96; 222/3; 251/62, 63, 294, 324

[56] References Cited

U.S. PATENT DOCUMENTS

| | | |
|---|---|---|
| 2,564,686 | 8/1951 | Gray . |
| 3,072,289 | 1/1963 | Stopp ........................................... 222/3 |
| 3,150,388 | 9/1964 | Oliphant . |
| 3,563,508 | 2/1971 | DeLorenzo ............................... 251/324 |
| 4,549,870 | 10/1985 | Wass .......................................... 441/41 |
| 4,624,441 | 11/1986 | Kreitchman et al. ...................... 251/43 |

*Primary Examiner*—Sherman Basinger
*Attorney, Agent, or Firm*—Mitchell P. Novick

[57] ABSTRACT

A valve controls the flow of an inflation substance such as carbon dioxide from a pressurized container when the valve is actuated. The valve comprises a valve body having an inflow bore, inlet conduit, chamber, interior chamber and interior passage connected to each other and with the pressurized container. The valve is connected to an inflatable apparatus such as an emergency slide or raft by an outlet conduit connected to the valve body and with the interior passage. The valve is closed by a piston assembly which is balanced. The piston assembly includes a guidance collar and a first piston rod connected to the guidance collar. The first piston rod has an O-ring seal, and the piston rod is attached to the valve body by a fitting. The second end of the piston rod extends through the piston fitting and has a valve actuation receiving means. A "second piston" module attached to the guidance collar has a second piston rod whose diameter is greater than the first piston rod's diameter, a bar, another O-ring seal, and a back-up ring. To close the valve the "second piston" module is slidably retained in the interior passage such that the O-ring seal closes interior passage. The force required to actuate the valve is determined by the diameters of the two piston rods. Axial movement of the first piston actuates the valve, the pressure from the pressurized container removing the "second piston" module from the interior passage, keeping the valve in the open position and allowing rapid inflation of the inflatable apparatus with the guidance collar forced against the piston fitting. The valve can be biased towards the open direction by reversing the diameters of the two piston rods.

30 Claims, 6 Drawing Sheets

INFLATION VALVE

BACKGROUND OF THE INVENTION

1. Field of the Invention

This invention relates to inflation valves, and more particularly to inflation valves used in conjunction with pressurized containers of an inflation substance such as carbon dioxide gas or other gases in liquid or gaseous form to inflate life rafts, life jackets, emergency slides and the like.

2. Description of the Prior Art

U.S. Pat. No. 2,564,686 to Gray discloses a valve mechanism for use in fluid lines comprising a plunger and a first sealing gasket attached to one of its ends. A second sealing gasket attached to the other end of the plunger is mounted outside the body of the valve assembly, and closes a vent when the valve is in the open position. In the closed position, the first sealing gasket is positioned in the bore between the inlet and outlet conduits, and the second sealing gasket opens the vent to prevent fluid pressure build up in the line.

Inflation valves on pressurized containers connected to emergency equipment such as life rafts are known in the art. Oliphant (U.S. Pat. No. 3,150,388) discloses a spring biased piston valve that is actuated once pressure in the container has dropped and the emergency equipment has been partially inflated using a first valve mechanism. This enables the rapid discharge of a large volume of the pressurized bottle's contents.

In U.S. Pat. No. 4,549,870 Wass discloses an inflation valve having a double-ended piston of uniform diameter having O-ring seals on both ends of the piston which is actuated by a pull-type firing mechanism. Wass also discloses a piston rod attached to a piston head having O-ring seals thereon in U.S. Pat. No. 4,595,374. In the latter invention the valve mechanism is actuated when a detachable cable causes axial movement of the outer end of the piston rod past a safety mechanism. In both Wass patents the force necessary to operate the valve is that amount of force necessary to overcome the drag of the O-ring seals.

The prior art patents disclose valves closed by positioning the piston head over a conduit thereby blocking passage of the pressurized fluid from its container to the outlet valve.

There is a need for an inflation valve wherein the amount of force necessary to operate it can be varied, and for a valve which can be opened with a small amount of force.

SUMMARY OF THE INVENTION

It is an object of the present invention to provide an inflation valve with piston rods having two different diameters on opposite ends of a guidance collar.

It is an object of the present invention to provide an inflation valve in which the amount of force needed to open the valve can be varied by selecting different piston rod diameters.

Another object of the present invention is to provide an inflation valve in which the direction that the piston is biased can be varied either towards the open or the closed position.

Still another object of the present invention is to provide an inflation valve in which the direction that the piston is biased can be pre-determined by selecting different piston rod diameters.

Another object of the present invention is to provide an inflation valve that requires a small amount of force to open it.

Yet another object of the present invention is to provide an inflation valve that has the piston assembly biased towards the open mode.

Still another object of the present invention is to provide an inflation valve that will open rapidly when actuated.

Still another object of the present invention is to provide an inflation valve that will remain in the open position once the valve is actuated.

Another object of the present invention is to provide an inflation valve which can be maintained in the open position once the valve is actuated. by the pressure from a pressurized container containing an inflation gas.

Another object of the present invention is to provide an inflation valve that can be opened regardless of the angle at which the actuation means is pulled.

Still another object of the present invention is to provide an inflation valve which has a minimum number of moving parts.

Still another object of the present invention is to provide an inflation valve that is reliable and easy to service.

The present invention provides an improved inflation valve with a guidance collar positioned between two different diameter piston rods, and with O-ring seals along the piston rods, such that the force on the guidance collar is a function of the difference between the two diameters. This results in a valve in which the force necessary to actuate the valve can be controlled by choosing an appropriate ratio between the diameters of the two piston rods. The valve can be biased towards either an open or closed position, depending on how the two different diameter piston rods are positioned within the valve. When the larger diameter piston rod of one embodiment is positioned within an interior passage, a first O-ring seal mounted on that piston rod enters the interior passage to form a seal and one surface of the guidance collar contacts the entrance opening to the interior passage, the valve is in its normally closed position. The second O-ring seal mounted on the smaller piston rod, slidably retained in a fitting attached to the valve body, prevents gas from leaking out of the valve body. The force from the pressurized container of an inflation substance such as carbon dioxide gas holds the piston head guidance collar in the closed position until the valve is opened. The force necessary to move the piston against the pressure to open the valve is a function of the difference between the diameters of the two piston rods. Once the present invention is actuated, the pressure of the pressurized fluid maintains the valve in an open position.

The diameters of the piston rods are reversed when the inflation valve is biased towards the open position. The larger diameter piston rod with an O-ring seal prevents gas from leaking to the outside, and the smaller piston rod prevents gas from flowing out the outlet of the valve. For this embodiment a standard pull cable with a ball at the end prevents the valve from being opened by the pressure. The ball at the end of the pull cable is locked in a notch in the piston rod between an annular groove and the end of the piston rod. This embodiment of the present invention can be actuated from any direction.

DESCRIPTION OF THE PREFERRED EMBODIMENT

The inflation valve of the present invention can be used in conjunction with emergency equipment such as aircraft emergency slides, life rafts or life vests. These valves are typically mounted on a pressurized container containing an inflation substance, and the valve outlet is connected to the emergency apparatus to be inflated. The inflation substance generally is a gas such as carbon dioxide, or a liquid which will convert to a gas when the pressure is released. Other gases such as nitrogen, or a mixture of nitrogen and carbon dioxide, can also be utilized. The inflation valve is pressurized through a charging valve, and the inflation valve stays pressurized, typically to 2000–3000 psig, for several years until the valve is actuated. These valves are used in emergency situations and must open rapidly when actuated and remain open to allow a maximum flow until all the gas has passed through the valve. The present invention does not employ balls, pulleys, poppets, needles or gates as are used in other inflation valves. The present invention employs a piston head with a guidance collar positioned between its two piston rods, the piston rods being of different diameters, such that the pressure forces working on the piston cancel, except for a small amount left on purpose to bias the inflation valve towards either the open or closed position in both cases. An advantage of the present invention is that once the valve is opened, the balance of the piston is gone which causes pressure from the container of pressurized fluid to force the piston to its "wide open" position and maintain it there, without the need of additional safety pins or pawls, preventing the inflation valve from becoming unintentionally closed during inflation.

Figure 1:
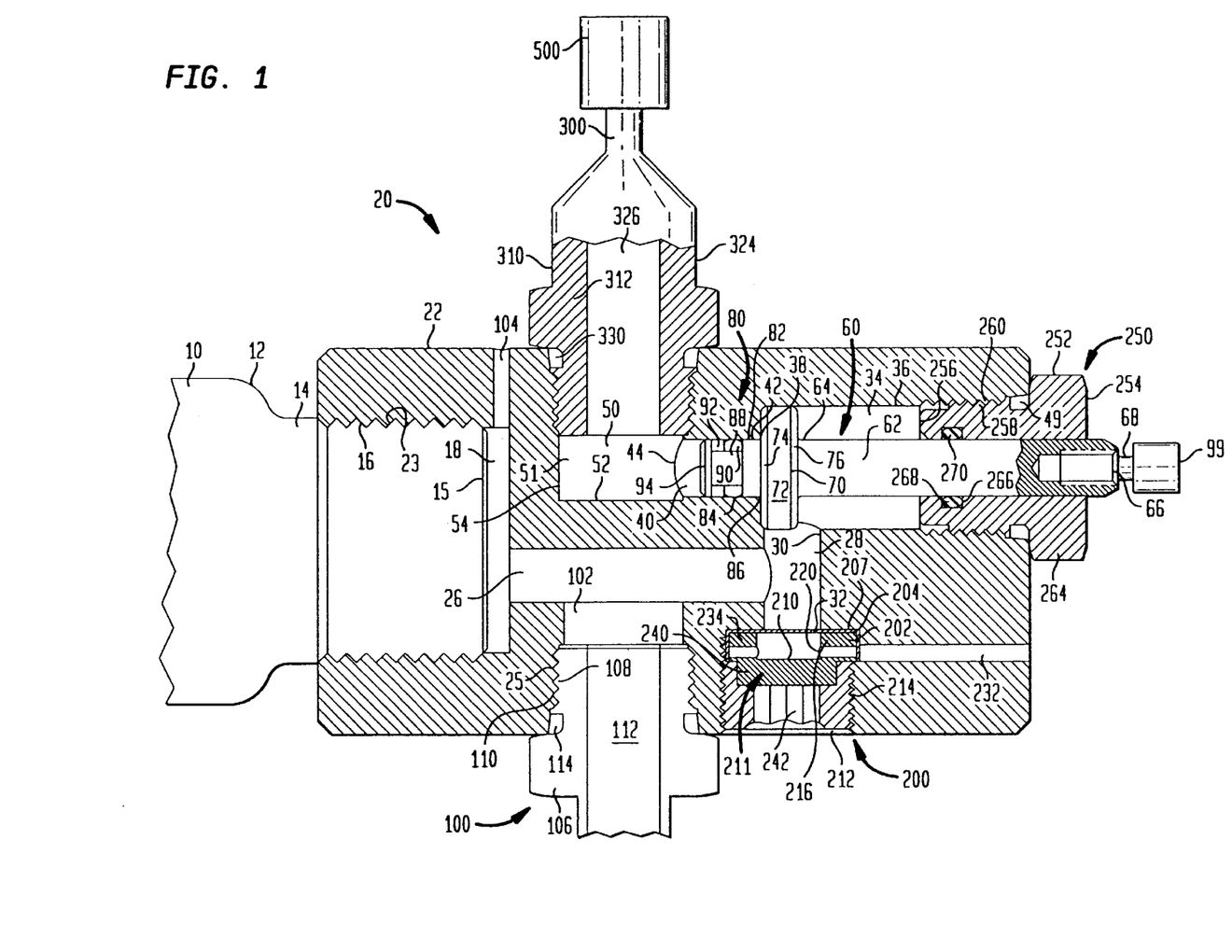
FIG. 1 is a side sectional view of the inflation valve of the present invention in the closed position.

The inflation valve 20 of the present invention is attached to a container of pressurized inflation substance 10 having a neck 14 extending upwards from shoulder 12 (FIG. 1). Threads 16 are disposed on the outside of neck 14 and mate with compatible container port threads 23 on valve body 22. A washer 18 is positioned between the container top 15 and valve body 22 to form a tight seal. Vent 104 prevents threads 23 from being pressurized in case of leakage across washer 18 and enables leakage, should it occur between washer 18 and container 10 and valve body 22, to escape vent 104 communicating with the outside of valve body 22. In the preferred embodiment the present invention uses carbon dioxide gas for inflation. During normal use, the inflation valve is charged and in the closed position. Only when the piston assembly 60 is actuated does the valve effect its open position.

The threads on the various fittings and threads 16 on the container 10 generally are male threads: container port threads 23 and threads 25 on valve body 22 for receiving the container or other fittings, respectively, generally are female. When the inflation valve is intended for use with female threaded cylinders, male threads are used. The fittings are standard SAE fittings, and have a top with a hexagonal nut configuration to facilitate their being threaded into the inflation valve, although tops with circular or other configurations can also be utilized.

Gas flows from container 10 through inlet conduit 26 and into chamber 28. Chamber 28 is generally perpendicular with inlet conduit 26, and communicates with interior chamber 34 at one end 30. The other end 32 of chamber 28 is closed off by the pressure relief mechanism 200 attached to valve body 22.

Within valve body 22 interior chamber 34 communicates with interior passage 40 at its first end 42. Interior passage 40 communicates with outlet port 50 at passage second end 44. Interior chamber 34 is bounded by interior chamber wall 36. Port wall 52 defines the depth of outlet port 50, containing outlet port bore 51 therein. The diameter of outlet port 50 is defined by wall 54 and passage second end 44. Outlet port 50 extends to a first end 42 where interior passage 40 connects with interior chamber 34 and chamber end wall 38.

Interior chamber wall 36 extends from chamber end wall 38 to an end of valve body 22. Interior chamber 34 is closed at one end by means of a piston assembly 60 mounted within and connected to valve body 22 by piston fitting 250 (FIG. 1).

Piston assembly 60 is a single unit comprising a first piston rod 62, a guidance collar 70 and a "second piston" module 80. Guidance collar 70 is between first piston rod 62 and "second piston" module 80. Guidance collar 70 is circular, having annular side wall 72, front surface 74 and back surface 76. Guidance collar 70 serves to guide the piston assembly within valve body 22. Guidance collar 70 may also be hexagonal or other configurations based on assembly and/or manufacturing requirements. First piston rod 62 is attached at its first end 64 to guidance collar back surface 76. Guidance collar 70 is slidably retained within chamber 34. Second piston rod 82 having front end 84 and back end 86 is attached to guidance collar front surface 74. This embodiment of the present invention is designed to have the piston biased towards a closed position. To achieve this the diameter of interior passage 40, and consequently the diameter of second piston rod 82, has to be greater than the diameter of first piston rod 62.

Figure 2:
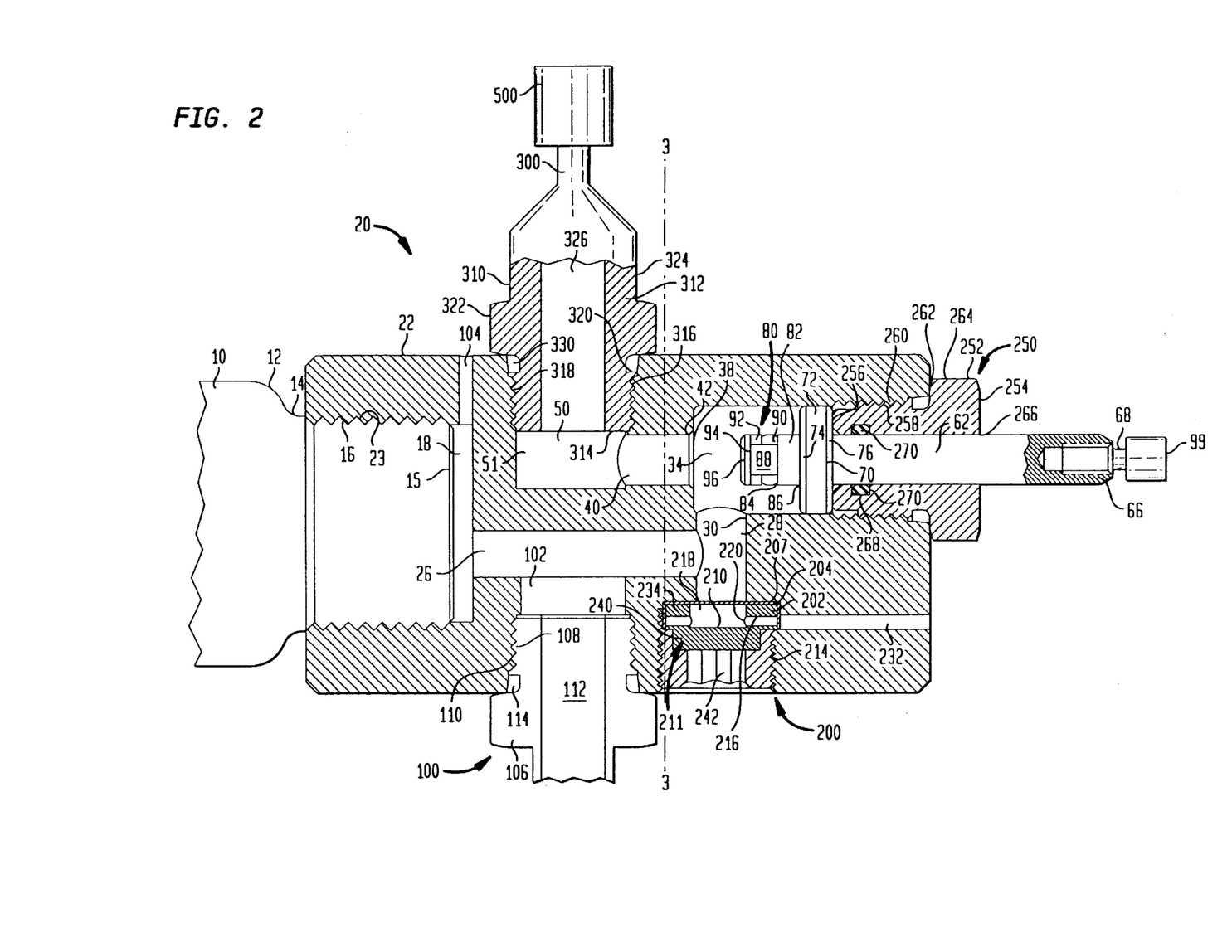
FIG. 2 is a side sectional view of the inflation valve of the present invention in the open position.

Bar (or third piston rod) 88 is attached to second piston rod front surface 84. First O-ring seal 90 is disposed around bar 88, and is retained by back-up ring 92. piston end 94 retains back-up ring 92. As shown in FIGS. 1 and 2, these are components of "second piston" module 80 (FIG. 1). Piston end 94 is chamfered and forms chamfered end 96.

Piston assembly 60 is retained within piston fitting 250 which is threadably connected to valve body 22 (FIG. 1). To close inflation valve 20, "second piston" module 80 is positioned within interior passage 40 so that guidance collar front surface 74 is in contact with chamber end wall 38. "Second piston" module 80 is slidably retained within interior passage 40, and first O-ring seal 90 forms a gas-tight seal to prevent gas from flowing through interior passage 40 and outlet port 50 to outlet conduit 300. Second O-ring seal 270 disposed around first piston rod 62 prevents leakage of gas through piston fitting 250.

Piston fitting 250 has a body 252, top 254, bottom 256, side 258 containing annular threads 260 disposed thereon, shoulder 262, and a head 264. Fitting body 252 contains a bore 266 that extends the length of the fitting. Disposed within body 252 and proximate the bottom 256 is an annular groove 268 into which second O-ring seal 270 is received. Annular groove 268 intersects bore 266. Second O-ring seal 270 is disposed on first piston rod 62, and it enables piston assembly 60 to be slidably retained within bore 266. Second O-ring seal 270 maintains a sufficiently gas-tight seal to prevent gas from escaping interior chamber 34 and out valve body through bore 266 once inflation valve 20 has been charged. First piston rod second end 66 extends out the top of piston fitting 250. Valve actuation receiving means 68 located at first piston rod second end receive a means 99 for actuating the inflation valve. Inflation valve actuation means 99 includes a firing pin, a ripcord or detachable cable.

The diameters of the first piston rod 62 and the second piston rod 82 are selected so that the forces acting on the guidance collar will almost be balanced.

If only the pressure from the container were used to maintain the guidance collar in the closed position, the forces needed to open the inflation valve would be very high. By avoiding any diameter differences for the pressure to act on or by creating the same pressure difference on both sides of the guidance collar with diameters of the same size the piston assembly becomes balanced. In this manner the forces created by the pressure go in opposite directions, and cancel each other to zero force if the diameters are identical.

In the present invention the diameters of the piston rods are selected such that there will be a net force that has to be overcome when the valve is being opened. Generally, the force selected to effect opening of the valve is between 15–25 pounds, but by adjusting the diameters of the two piston rods, any desired force requirement can be established.

The present embodiment is biased towards keeping the piston in the closed position, the diameter of second piston rod being greater than the diameter of first piston rod. Varying the diameter of the piston rods such that the second piston rod diameter is less than the diameter of the first piston rod biases the system towards the open position.

Once the valve is opened, the system is no longer balanced. Opening is achieved by pulling the piston assembly 60 in an axial manner past the opening of interior passage 40 using valve actuation means 99 connected to first piston rod second end 66. Once "second piston" module 80 passes the opening of interior passage 40 the full system pressure forces the piston assembly to the open position as shown in FIG. 2, and holds the piston assembly in this position while inflation is occurring. Piston fitting 250 limits the lateral movement of piston assembly 60.

Inflation valve 20 is connected to the inflatable apparatus 500 by outlet conduit 300 attached by outlet fitting 310 to valve body 22. Fitting 310 has a body 312, bottom 314, neck 316, threads 318, shoulder 320, a top 322, upper portion 324, and a bore 326 which extends the length of outlet fitting 310. In this embodiment top 310 is hexagonal, but a top with a circular or flat configuration could also be utilized. Fitting 310 is received within valve body 22 by threads 318 disposed around neck 316 which engage mating threads 25 within valve body 22. O-ring seal 330 is disposed between valve body 22 and shoulder 320. Outlet conduit 300 communicates with outlet port 50 and inflatable apparatus 500, outlet conduit 300 being connected with the bore 326 of fitting 310 by a threaded fitting (not shown) which engages threads (not shown) disposed on fitting 310.

Figure 3:
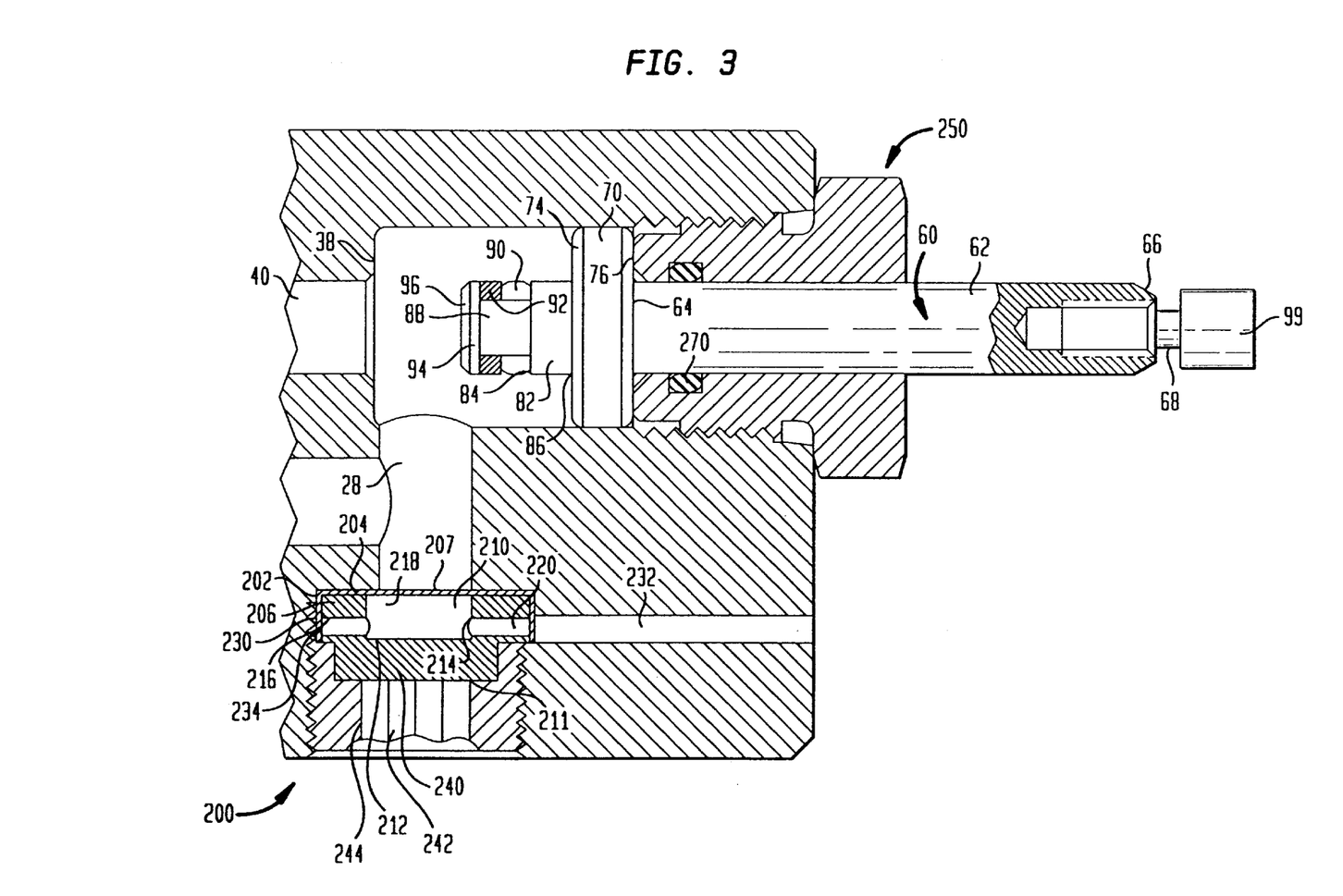
FIG. 3 is a detailed side sectional view of the pressure relief mechanism taken along line 3—3 of FIG. 2.

A pressure relief mechanism 200 (FIG. 3) is attached to inflation valve 20. When the pressure within valve 20 exceeds a specified maximum pressure, frangible disc 202 ruptures and gas flows from container 10 through the conduits, chamber 28, frangible rupture disc 202, relief port 210, relief channel 230 and vent 232 to the outside. Rupture disc 202 is generally metallic and has lower surface 204 which is positioned atop gasket 207 which forms an end of chamber 28. A retainer ring 234 is positioned adjacent to rupture disc upper surface 206 and surrounds relief port 210. Relief port 210 is held in place by a fitting 211 having top 212, side wall 214, and bottom edge 216, bottom edge 216 containing an opening 218 therein. Openings 220 in side wall 214 enable relief port 210 to communicate with relief channel 230. Relief channel 230 is connected to vent 232 which extends from relief channel through valve body 22 to the outside. Port retainer 240 is adjacent relief port top 212, and is held in place by set screw 242 whose threads 244 engage mating threads on the inside of valve body 22.

A charging valve 100 is connected to the inflation valve to pressurize the system, and is in communication with inlet conduit 26. When the system is charged gas flows from charging valve 100 through inlet conduit 26, chamber 28 and interior chamber 34, and into container 10. Charging valve 100 is a threaded fitting with a body 106, inner neck 108, and threads 110 disposed on neck 108. Threads 110 engage mating container port threads within valve body 22. A charging bore 112 is coextensive with the length of fitting 106 and communicates with inflow port 102. An O-ring seal 114 is between charging valve 100 and valve body 22 to form a tight seal. Charging valve further comprises a threaded outer neck 120 which serves as a coupling means for connecting charging valve 100 to a source (not shown) of the gas used to pressurize container 10 and inflation valve 20.

Figure 4:
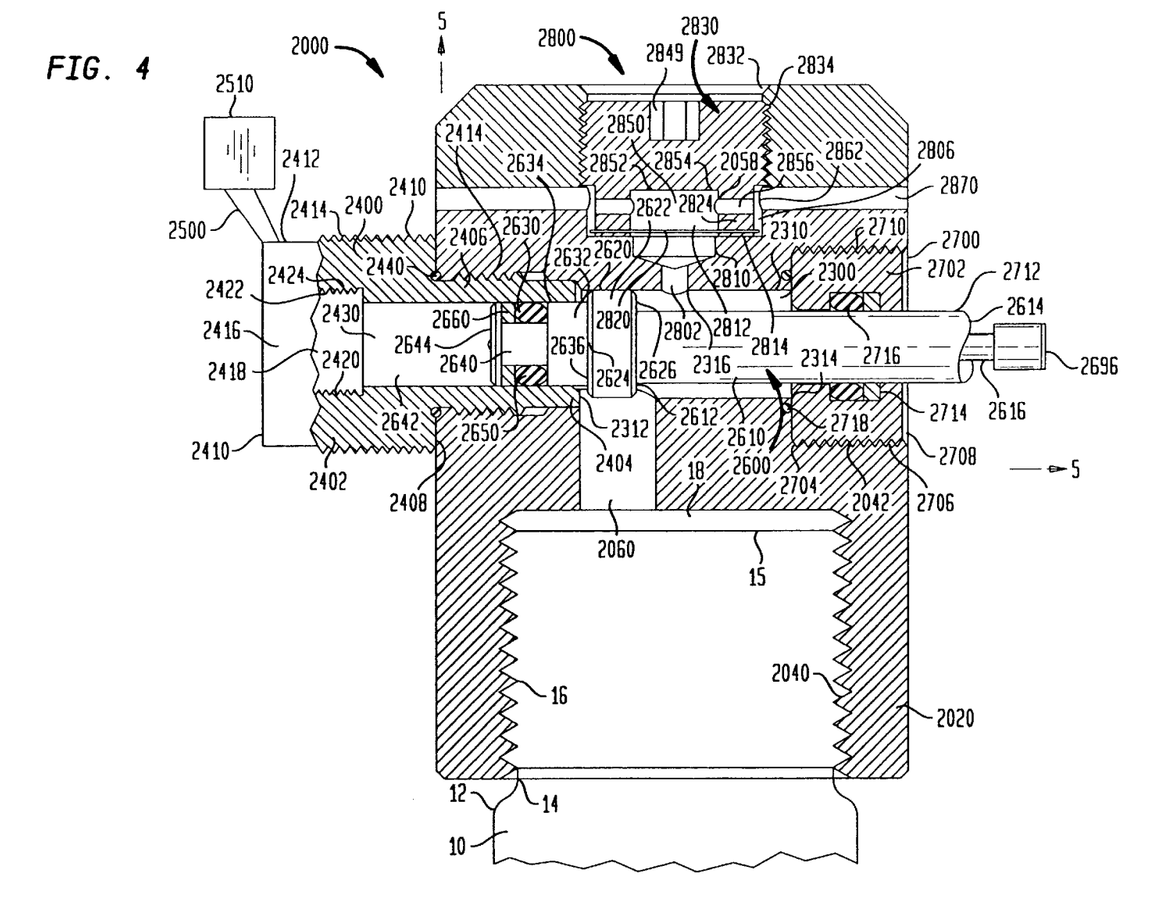
FIG. 4 is a side sectional view of a second embodiment of the inflation valve.

A second embodiment of the present invention is shown in FIG. 4. The inflation valve 2000 is attached to a container 10 of a pressurized inflation gas having a shoulder 12 and a neck 14 extending upwards from shoulder 12. Threads 16 disposed on the outside of neck 14 mate with compatible container port threads 2040 on valve body 2020. Threads 2042 within valve body 2020 receive mating threads of the various fittings attached to the inflation valve. Washer 18 is positioned between the container top 15 and valve body 2020 to form a tight seal. During normal use, the inflation valve is charged and in the closed position, as shown in FIG. 4. Only when the piston assembly is actuated does the valve effect its open position.

Inlet conduit 2060 is open at both ends, allowing the flow of gas from container 10 to interior chamber 2300. Interior chamber 2300 is generally perpendicular to inlet conduit 2060. Interior chamber 2300 is open at one end where it communicates with interior passage 2430 which in turn communicates with outlet conduit 2424. The diameter of interior chamber 2300 is generally greater than the diameter of interior passage 2430. Interior chamber 2300 is defined by interior wall 2310, chamber end wall 2312, and second end 2314. The second end 2314 of interior chamber 2300 is the bottom of piston fitting 2700.

Outlet fitting 2400 has body 2402, bottom 2404, neck 2406, shoulder 2408 and top 2410. Bottom 2404 serves as the interior chamber end wall 2312. A plurality of threads 2414 are disposed on the outside surface 2412 of top 2410 and neck 2406. Threads 2414 on neck 2406 engage mating threads 2042 to attach outlet fitting 2400 to valve body 2020. An O-ring seal 2440 is between valve body 2020 and threaded neck 2406.

A bore 2416 that comprises two sections in communication with each other is coextensive with the length of outlet fitting body 2402. Upper bore 2418 is proximate the top 2412, and its diameter is greater than the diameter of lower bore 2430. The inside wall 2420 of upper bore 2418 has threads 2422 which can receive a fitting. Outside surface 2410 has threads 2411 which can receive a fitting attaching outlet connector means 2500 to the inflation valve 2000. Outlet connector means 2500 connects the inflatable apparatus 2510 to inflation valve 2000. Lower bore 2430 will hereafter be referred to as interior passage 2430.

During normal use of the inflation valve 2000, interior passage 2430 is closed at the end proximate fitting bottom 2404 by piston assembly 2600 (FIG. 4).

Piston assembly 2600 is a single unit comprising a first piston rod 2610, a guidance collar 2620 and a "second piston" module 2630. Guidance collar 2620 is between first piston rod 2610 and "second piston" module 2630. Guidance collar 2620 is circular, having annular side wall 2622, front surface 2624 and back surface 2626. Guidance collar can also have a hexagonal or other configuration, dependent upon design considerations. First piston rod 2610 is attached at its first end 2612 to guidance collar back surface 2626. Guidance collar 2620 is slidably retained within interior chamber 2300. "Second piston" module includes second piston rod 2632 having rod front end 2634 and rod back end 2636, rod back end 2636 connecting "second piston" module 2630 to guidance collar front surface 2624. The diameter of second piston rod 2632 is greater than the diameter of first piston rod 2610.

Included within "second piston" module 2630 are bar (or third piston rod) 2640 attached to second piston rod front end 2634, and a first O-ring seal 2650 disposed on bar 2640. A back-up ring 2660 which is positioned by front end 2642 prevents first O-ring seal 2650 from being extruded during inflation (FIG. 4). Front end is chamfered and forms chamfered end 2644.

Piston assembly 2600 is retained within piston fitting 2700 which is threadably connected to valve body 2020 (FIG. 4). To close inflation valve 2000 "second piston" module 2630 is positioned within interior passage 2430 until guidance collar front surface 2624 is in contact with chamber end wall 2312. The "second piston" module 2630 is slidably retained within interior passage 2430, and first O-ring seal 2650 prevents gas leakage from interior chamber 2300 once inflation valve 2000 has been charged. The sealing effect of second O-ring seal 2716 on the first piston rod 2610 prevents leakage of gas through piston fitting 2700.

Piston fitting 2700 comprises a body 2702, a bottom 2704, side 2706 and top 2708. Fitting body 2702 has a bore 2712 that is coextensive with the length of body 2702. Annular groove 2714 is disposed within body 2702 and intersects bore 2712. Annular groove 2714 is sized to receive and receives second O-ring seal 2716. Threads 2710 disposed on side 2706 engage mating threads 2042 on valve body 2020. Second O-ring seal 2716 is sized so as to enable piston assembly 2600 to be slidably retained within bore 2712, yet maintain a sufficiently gas-tight seal to prevent gas from escaping interior chamber 2300 through bore 2712. Second end 2614 of first piston rod 2610 extends out top 2708 of piston fitting 2700. Valve actuation receiving means 2616 located at first piston rod second end receive a means 2696 for actuating the inflation valve. Inflation valve actuation means 2696 includes a firing pin, a ripcord or detachable cable.

An O-ring seal 2718 is received between valve body 2020 and piston fitting 2700 when piston fitting 2700 is in threaded engagement with valve body 2020. The O-ring seal 2718 is typically installed on piston fitting 2700 before piston fitting 2700 is threaded into valve body 2020, piston fitting 2700 being received by threads 2042.

The diameters of the first piston rod 2610 and the second piston rod 2632 are selected so that the forces acting on the guidance collar will almost be balanced.

If only the pressure from the container were used to maintain "second piston" module 2630 and the guidance collar 2620 in the closed position, the forces needed to open the inflation valve would be very high. By avoiding any diameter differences for the pressure to act on or by creating the same pressure difference on both sides of the guidance collar with diameters of the same size the piston assembly becomes balanced. In this manner the forces created by the pressure go in opposite directions, and cancel each other to zero force if the diameters are identical.

In the present invention the diameters of the piston rods are selected such that there will be a net force that has to be overcome when the valve is being opened. Generally, the force selected to effect opening of the valve is between 15–25 pounds, but by adjusting the diameters of the two piston rods, any desired force requirement can be established.

Once the valve is opened, the system is no longer balanced.

Opening is achieved by moving the piston assembly 2600 in an axial manner out of the opening of interior passage 2430 using valve actuation means 2696 connected to second end 2614. Once "second piston" module 2630 passes chamber end wall 2312 the full system pressure forces the piston assembly open and holds it open while inflation is occurring. Piston fitting 2700 limits the axial movement of piston assembly 2600.

Figure 5:
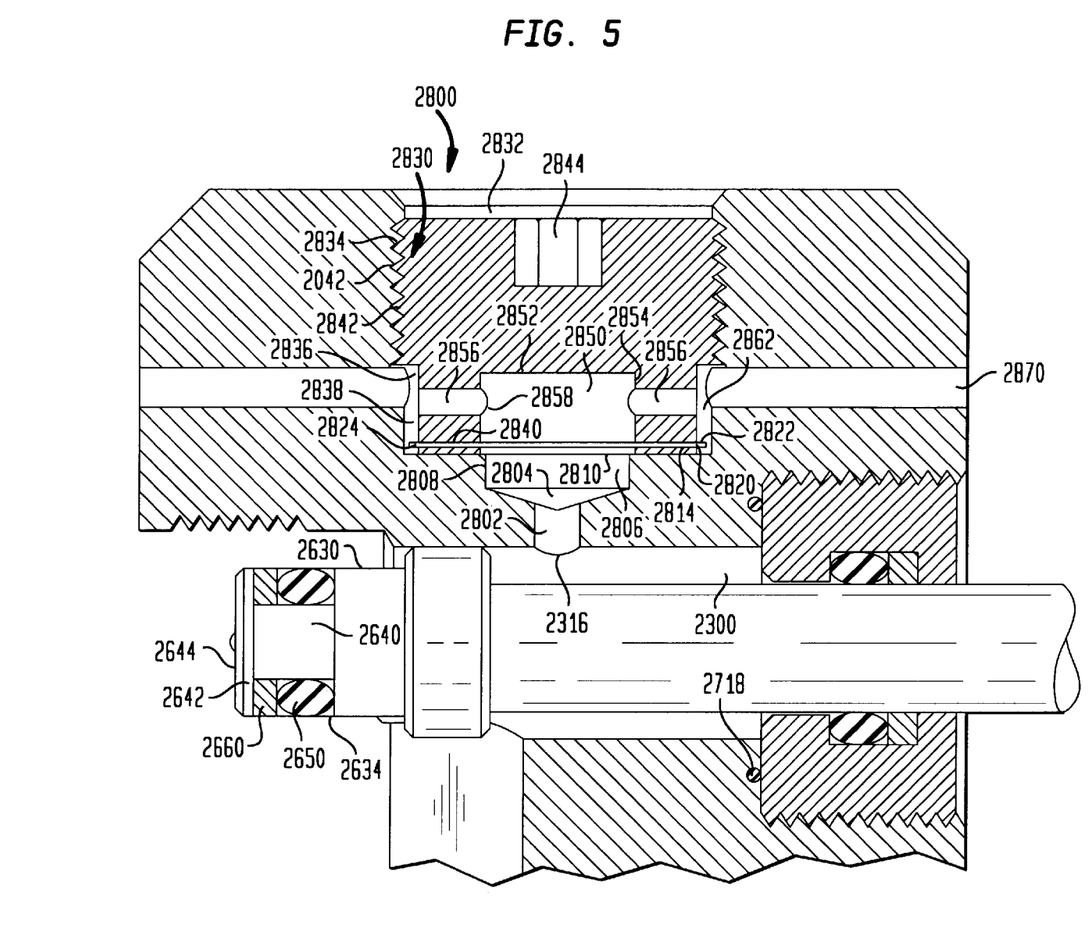
FIG. 5 is a detailed side sectional view of the pressure relief mechanism taken along line 5—5 of FIG. 4.

A pressure relief mechanism 2800 is attached to valve body 2020 (FIG. 5). When pressure within valve 2000 exceeds a specified maximum pressure, frangible disc 2820 ruptures and gas is vented to the outside.

Relief passage 2802 communicates with interior chamber 2300 at an opening 2316 at the first end of relief passage. Relief passage second end 2804 flares outward to form bowl 2806. Bowl 2806 has side wall 2810 and top edge 2812, onto which gasket 2814 is positioned. Frangible rupture disc 2820 having upper surface 2822 and lower surface 2824 is positioned atop gasket 2814, lower surface 2822 in contact with gasket 2814.

Relief fitting 2830 comprises a top surface 2832, side 2834, shoulder 2836, neck 2838 and bottom 2840. Relief fitting bottom 2840 engages rupture disc upper surface 2822. Threads 2842 disposed on side 2834 engage mating threads 2042 within valve body 2020. An internal hexagon 2844 disposed within relief fitting top 2832 is used to drive relief fitting into threaded engagement with valve body 2020.

Relief port 2850 is bored within the center of relief fitting bottom, forming port top 2852 and port sidewall 2854. Relief channels 2856 communicate from openings 2858 in relief port sidewall 2854 to the side of relief fitting 2830. Two vent tubes 2870 communicate with relief channels 2856, and extend from the outside of valve body towards the neck 2838 and intersect relief conduit 2862 at one end. The other end of relief conduit 2862 intersects relief channel 2856. When rupture disc 2820 ruptures, gas flows through rupture disc 2820, relief port 2850, relief channels 2856, relief conduit 2862 and vents 2870 to the outside of inflation valve 2000.

This embodiment of the present invention is pressurized using a charging valve (not shown), similar to that of the preferred embodiment, and which communicates with-interior chamber 2300 and container 10.

In the preferred embodiment, the charging valve is manufactured in accordance with Military Standard MS28889, which is incorporated by reference herein.

Figure 6:
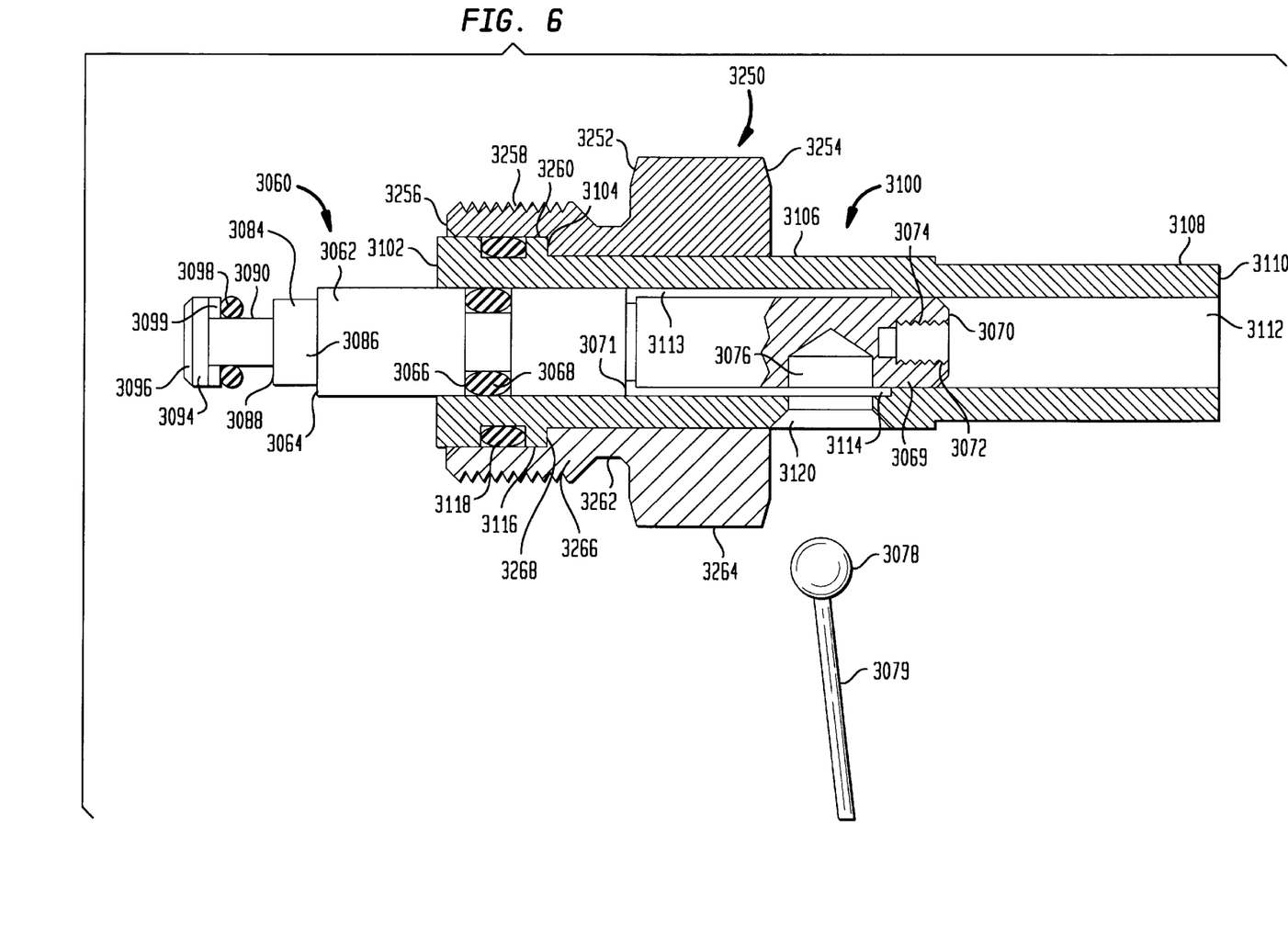
FIG. 6 is a side sectional view of a third embodiment of the inflation valve.

A third embodiment of the present invention (FIG. 6) is similar to the second embodiment, but the piston assembly is designed so the valve can be opened regardless of the direction from which a force is applied to the valve actuation means to remove it from the valve. Other elements of the third embodiment including the charging valve, outlet fitting and pressure relief mechanism are similar to those of the second embodiment shown in FIG. 4. In the third embodiment of the present invention, the diameter of the first piston rod is greater than the diameter of the second piston rod (FIG. 6). The piston assembly is retained within a swivel within the piston retaining fitting, enabling the piston assembly to rotate. This embodiment is biased towards the open position, and the swivel and the piston rod end contain a receptacle to receive the ball end of a standard pull cable actuation means with a ball 3078 at the end to keep the inflation valve in the closed position. When the ball end 3078 of the cable 3079 is pulled from the receptacle, the pressure from within the valve drives the piston to an open position.

Piston assembly 3060 is a single unit comprising a first piston rod 3062, a second piston rod 3084 and third rod 3090, second piston rod 3084 disposed between first piston rod 3062 and third rod 3090. Second piston rod is circular, having annular side wall 3086 and front surface 3088. First piston rod 3062 is attached at its first end 3064 to second piston rod 3084. Second piston rod 3084 is slidably retained within interior passage 2430. Third rod 3090 having front end 3094 is adjacent to second piston rod front surface 3088. Third rod 3090 serves as an O-ring groove and supports an O-ring seal 3098 and back-up ring 3099 which are retained on third rod 3090. The surface of front end 3094 is chamfered to form chamfered front end 3096. The diameter of first piston rod 3062 is greater than the diameter of second piston rod 3084.

First piston rod 3062 has annular groove 3066 which receives an O-ring seal 3068. First piston rod second end 3070 contains an opening 3072 which may contain threads 3074 and which may receive a set screw (not shown). Such a threaded end may be used to facilitate removal of the piston assembly 3060 from inflation valve body 2020. First piston rod neck 3069 is between first piston rod annular groove 3066 and second end 3070. A notch 3076 is situated in first piston rod neck 3069 proximate to first piston rod second end 3070. Notch 3076 is sized to receive and receives the ball end of a standard ball and cable 3079 valve actuation means. Notch 3076 can also receive a valve actuation means other than a ball and cable valve actuation means.

Piston assembly 3060 is slidably retained within a swivel 3100 which is rotatably mounted within piston fitting 3250. Swivel 3100 comprises a first end 3102, shoulder 3104, neck 3106, tail 3108, second end 3110, outer bore 3112 and inner bore 3113. The axial movement of piston assembly 3060 within swivel 3100 is limited by the neck 3114 within inner bore 3113. Outer bore 3112 serves as a safety shield to prevent damage to the apparatus being inflated or to individuals when the inflation valve has been actuated. Annular groove 3116 which is proximate swivel first end 3102 receives an O-ring seal 3118 which prevents gas leakage through piston fitting 3250. The opening 3120 within neck 3106 is sized to allow the ball 3078 end of a ball and cable assembly to pass therethrough and be retained within notch 3076. Opening 3120 can also receive a valve actuation means other than a ball and cable valve actuation means. Axial movement of the piston assembly with respect to the swivel causes the ball to be retained within the notch and to maintain the inflation valve in a closed position after the valve has been charged.

Piston fitting 3250 has a body 3252, top 3254, bottom 3256, neck 3258 containing annular threads 3260 disposed thereon, shoulder 3262, and a head 3264. Fitting body 3252 contains a bore 3266 that extends the length of the fitting. Bore contains a shoulder 3268 that engages a corresponding shoulder 3104 of swivel 3100. O-ring seal 3118 enables swivel 3100 to be rotatably retained within bore 3266, and O-ring seal 3118 maintains a sufficiently gas-tight seal to prevent gas from escaping the valve once inflation valve 2000 has been charged. First piston rod second end 3070 extends out the top of piston fitting 3250 and swivel 3100 where notch 3076 receives a ball and cable valve actuation means.

Piston assembly 3060 and swivel 3100 are rotatably retained within piston fitting 3250 which is attached to valve body 2020. To close inflation valve 2000, second piston rod 3084 is positioned within interior passage 2430 until first piston rod first end 3064 bottoms on passage fitting bottom 2404, with chamfered front end 3096., O-ring seal 3098, back-up ring 3099 and third rod 3090 being within interior passage 2430. Second piston rod 3084 is slidably retained within interior passage 2430. An O-ring seal 3068 around first piston rod prevents leakage of gas through swivel 3100.

The diameters of the first piston rod 3062 and the second piston rod 3084 are selected so that the forces acting on the piston assembly will almost be balanced.

If only the pressure from the container were used to maintain the first piston rod 3062 and second piston rod 3084 in the closed position, the forces needed to open the inflation valve would be very high. By avoiding any diameter differences for the pressure to act on or by creating the same pressure difference on both sides of the piston assembly with diameters of the same size the piston assembly becomes balanced. In this manner the forces created by the pressure go in opposite directions, and cancel each other to zero force if the diameters are identical.

In the present invention the diameters of the piston rods are selected such that there will be a net force towards opening. Movement of the piston towards opening is prevented by the ball end 3078 of a standard pull cable with a ball at the end which is retained within notch 3076. Generally, the force selected to remove the ball 3078 from the notch is between 15–25 pounds, but by adjusting the diameters of the two piston rods, any desired force requirement can be established.

Once the valve is opened, the system is no longer balanced.

Opening is achieved by removing the ball end 3078 of a standard pull cable with a ball at the end from notch 3076 and through opening 3120 in swivel 3100. Once the ball end 3078 has been removed from notch 3076, piston assembly 3060 is moved in an axial manner past the opening of outlet fitting (interior passage) 2400. Once second piston rod front surface 3088 is no longer in contact with outlet fitting bottom 2404 the full system pressure forces the piston assembly open and holds it open while inflation is occurring. The axial movement of piston assembly 3060 is limited by neck 3071 of the piston assembly contacting neck 3114 within inner bore 3113.

In this third embodiment of the present invention, the piston assembly, the swivel and thus the valve actuation means receptacle rotates within the body of the inflation valve. This combined rotation of the piston assembly and the swivel in which it is mounted enables this embodiment of the inflation valve to be opened from any direction and any angle. In the first two embodiments of the present invention opening (actuation) is effected by axial movement of the piston assembly from an angle generally perpendicular to the plane of the container 10 because the piston assembly cannot rotate within the inflation valve. Thus the third embodiment can be used in a greater number of applications than is possible with currently existing valves and the other two embodiments disclosed herein.

Therefore, although this invention has been described with a certain degree of particularity, it is to be understood that the present disclosure has been made only by way of illustration and that numerous changes in the details of construction and arrangement of parts may be resorted to without departing from the spirit and scope of the invention.

I claim:

1. A valve for controlling the flow of an inflation substance from a pressurized container when the valve is actuated, the valve comprising:
   a. a valve body having an inflow bore and an inlet conduit, a chamber having a first end, an interior chamber and an interior passage, said inflow bore communicating with said pressurized container and said inlet conduit, said-inlet conduit intersecting said chamber, said chamber first end being in communication with said interior chamber, said interior chamber having an end wall and connecting with said interior passage;
   b. an outlet means attached to said valve body and in communication with said interior passage;
   c. a piston assembly comprising:
      (1) a guidance collar having a front surface and a back surface;
      (2) a first piston rod having a diameter, a first end and a second end, said first piston rod first end attached to said guidance collar back surface;
      (3) a second piston module, said second piston module further comprising a second piston rod having a diameter greater than said first piston rod diameter, said second piston rod having a front end and a back end, said second piston rod back end attached to said guidance collar front surface, a bar attached to said second piston rod front end, a first O-ring seal, said first O-ring seal disposed around said bar and adjacent a back-up ring, said back-up ring retained by a piston end, said second piston module being slidably received within said interior passage;
   d. piston retaining means having a body, a top, and a bottom, said body having a bore therethrough, said body having an annular groove disposed therein and said annular groove intersecting said bore, said annular groove sized to receive and receiving a second O-ring seal, said bore sized to receive and receiving said first piston rod, said second O-ring seal disposed around said first piston rod, said first piston rod slidably retained within said bore, said piston retaining means attached to said valve body that said piston retaining means bottom closes said interior chamber, said first piston rod second end extends through said top of said piston retaining means, said second O-ring seal forms a seal preventing leakage of said inflation substance through said bore, said second piston module positioned within said interior passage between said chamber end wall and said outlet means, said first O-ring seal forms a seal between said second piston rod and said interior passage thereby closing said valve, said guidance collar front surface contacts said interior chamber end wall;
   e. a pressurizing means attached to said valve body, said pressurizing means in communication with said interior conduit, said interior chamber and said container;
   f. a chamber closing means attached to said valve body and forming a second end of said chamber; and
   g. valve actuation receiving means on said first piston rod second end, whereby when a valve actuation means effects axial movement of said piston assembly and said second piston module is removed from said interior passage, the pressure from said pressurized container drives said piston assembly to said bottom of said piston retaining means, allowing said inflation substance to flow from said pressurized container through said inflow bore, said inlet conduit, said chamber, sail interior chamber, said interior passage and said outlet means, and said guidance collar back surface contacts said piston retaining means bottom.

2. The valve as described in claim 1, wherein said pressurizing means is a charging valve.

3. The valve as described in claim 2, wherein said chamber closing means is a pressure relief mechanism.

4. The valve as described in claim 3, wherein the diameter of said interior chamber is greater than the diameter of said interior passage.

5. The valve as described in claim 4, wherein said valve body further comprises a plurality of means for receiving fittings.

6. The valve as described in claim 5, wherein said outlet means comprises an outlet fitting attached to said valve body and in communication with said interior passage.

7. The valve as described in claim 6, wherein said outlet means further comprises an outlet conduit in communication with said outlet fitting and with an inflatable apparatus.

8. The valve as described in claim 7, wherein said piston retaining means further comprises a neck, said neck having threads disposed thereon, said threads engaging said means for receiving fittings disposed on said valve body to receive said piston retaining means.

9. The valve as described in claim 8, wherein said inlet conduit is generally perpendicular to said chamber.

10. The valve as described in claim 9, wherein said interior passage is generally parallel to said inlet conduit, and said outlet conduit is generally parallel to said chamber.

11. A system for inflating an inflatable apparatus, the system comprising:
    a. a container of pressurized inflation substance;
    b. an inflatable apparatus;
    c. a valve for controlling the flow of said inflation substance from said pressurized container to said inflatable apparatus, said valve comprising:
       (1) a valve body having an inflow bore and an inlet conduit, a chamber having a first end, an interior chamber and an interior passage, said inflow bore communicating with said pressurized container and said inlet conduit, said inlet conduit intersecting said chamber, said chamber first end being in communication with said interior chamber, said interior chamber having an end wall and connecting with said interior passage, said inlet conduit being generally perpendicular to said chamber, said interior passage being generally parallel to said inlet conduit;
       (2) an outlet conduit having a first end and a second end, said first end connected to said interior passage, said second end connected to said inflatable apparatus, said outlet conduit attached to said valve body by an outlet fitting, said outlet fitting having a body, a bottom, and a neck, said neck having threads disposed thereon, said threads engaging mating threads disposed on said valve body, said outlet conduit being generally parallel to said chamber;

(3) a piston assembly comprising:
  (a) a guidance collar having a front surface and a back surface;
  (b) a first piston rod having a diameter, a first end and a second end, said first piston rod first end attached to said guidance collar back surface;
  (c) a second piston module, said second piston module further comprising a second piston rod having a diameter greater than said first piston rod diameter, said second piston rod having a front end and a back end, said second piston rod back end attached to said guidance collar front surface, a bar attached to said second piston rod front end, a first O-ring seal, said first O-ring seal disposed around said bar and adjacent a back-up ring, said back-up ring retained by a piston end, said second piston module being slidably received within said interior passage;

(4) piston retaining means having a body, a top, and a bottom, said body having a bore therethrough, said body having an annular groove disposed therein and said annular groove intersecting said bore, said annular groove sized to receive and receiving a second O-ring seal, said bore sized to receive and receiving said first piston rod, said second O-ring seal disposed around said first piston rod, said first piston rod slidably retained within said bore, said piston retaining means attached to said valve body that said piston retaining means bottom closes said interior chamber, said first piston rod second end extends through said top of said piston retaining means, said second O-ring seal preventing leakage of said inflation substance through said bore, said second piston module positioned within said interior passage between said chamber end wall and the intersection of said outlet conduit first end, said first O-ring seal forms a seal between said second piston rod and said interior passage thereby closing said valve, said guidance collar front surface contacting said interior chamber end wall;

(5) a pressurizing means connected to said valve body and being in communication with said inlet conduit and said container;

(6) a pressure relief mechanism, said pressure relief mechanism being attached to said valve body and forming a second end of said chamber; and (7) valve actuation receiving means on said first piston rod second end, whereby when a valve actuation means effects axial movement of said piston assembly and said second piston module is removed from said interior passage, the pressure from said pressurized container drives said piston assembly to said bottom of said piston retaining means, allowing said inflation substance to flow from said pressurized container through said inflow bore, said inlet conduit, said chamber, said interior chamber, said interior passage and said outlet conduit to said inflatable apparatus, and said guidance collar back surface contacts said piston retaining means bottom.

12. A system for inflating an inflatable apparatus, the system comprising:
a. a container of pressurized inflation substance;
b. an inflatable apparatus;
c. a valve for controlling the flow of said inflation substance from said pressurized container to said inflatable apparatus, said valve comprising:
  (1) a valve body having an inlet conduit, an interior chamber having a first end and an end wall, said inlet conduit communicating with said pressurized container and said interior chamber, said inlet conduit being perpendicular to said interior chamber;
  (2) an outlet fitting attached to said valve body, said outlet fitting having a body, a top and a bottom, said body having a bore therethrough, said bore having an upper portion and an interior passage, said interior passage in communication with said interior chamber proximate said interior chamber end wall, said upper portion having means for receiving an outlet conduits;
  (3) an outlet conduit having a first end and a second end, said first end received by said upper portion and in communication with said interior passage, said second end in communication with said inflatable apparatus, said outlet conduit being parallel with said interior chamber;
  (4) a piston assembly comprising:
    (a) a guidance collar having a front surface and a back surface;
    (b) a first piston rod having a diameter, a first end and a second end, said piston rod first end attached to said guidance collar back surface;
    (c) a second piston module, said second piston module further comprising a second piston rod having a diameter greater than said first piston rod diameter, said second piston rod having a front end and a back end, said second piston rod back end attached to said guidance collar front surface, a bar attached to said second piston rod front end, a first O-ring seal and a back-up ring, said first O-ring seal and said back-up ring disposed around said bar, a piston end maintaining said first O-ring seal and said back-up ring in position with respect to said bar, said second piston module slidably received in said interior passage;
  (5) a piston retaining means having a body, a top and a bottom, said body having a bore therethrough, said body having an annular groove disposed therein and said annular groove intersecting said bore, said annular groove sized to receive and receiving a second O-ring seal, said bore sized to receive and receiving said first piston rod, said second O-ring seal disposed around said first piston rod, said first piston rod slidably retained within said bore, said piston retaining means attached to said valve body such that said piston retaining means bottom closes said interior chamber, and said first piston rod second end extends through said piston retaining means top, said second O-ring seal preventing leakage of said inflation substance through said bore, said second piston module positioned within said interior passage between said chamber end wall and said upper portion to close said valve, said guidance collar front surface in contact with said interior chamber end wall;
  (6) a pressurizing means connected to said valve body and in communication with said interior chamber and said container;
  (7) a pressure relief mechanism, said pressure relief mechanism being attached to said valve body and in communication with said interior chamber; and
  (8) valve actuation receiving means on said first piston rod second end, whereby when a valve actuation means exert a force effecting axial movement of said piston assembly and said second piston module is removed from said interior passage, the force from said pressurized container drives said piston assembly to said piston retaining means bottom, said inflation substance flows from said pressurized container through said valve body and said outlet conduit into said inflatable apparatus, and said guidance collar back surface contacts said piston retaining means bottom.

13. A valve for controlling the flow of an inflation substance from a pressurized container when the valve is actuated, the valve comprising:
  a. a valve body having an inlet conduit, an interior chamber having a first end and an end wall, said inlet conduit communicating with said pressurized container and said interior chamber;
  b. an outlet fitting attached to said valve body, said outlet fitting having a body, a top and a bottom, said body having a bore therethrough, said bore defining an interior passage, said interior passage in communication with said interior chamber proximate said interior chamber end wall;
  c. a piston assembly comprising:
    (1) a first piston rod having a diameter, a first end and a second end;
    (2) a second piston rod having a diameter, and two ends, the diameters of said piston rods not being equal;
    (3) a third rod or bar attached to said second piston rod;
    (4) a first O-ring seal disposed about said third rod, said second piston rod being slidably received in said interior passage;
  d. a piston retaining means having a body, a top and a bottom, said body having a bore therethrough, said piston retaining means attaching said piston assembly to said valve body with said piston assembly in communication with said interior chamber;
  e. a pressurizing means attached to said valve body, said pressurizing means in communication with said interior chamber and said container; and
  f. valve actuation receiving means on said first piston rod second end, whereby movement of a valve actuation means initiates movement of said piston assembly and said second piston rod is removed from said interior passage to a point or location at which the force from said pressurized container drives said piston assembly in the direction of said piston retaining means bottom, said inflation substance flows from said pressurized container through said valve body and said outlet fitting bore and said piston assembly approaches said piston retaining means bottom.

14. The valve as described in claim 13, wherein said piston assembly further comprises:
  a. a guidance collar having a front surface and a back surface;
    said first piston rod first end being attached to said guidance collar back surface;
    said second piston rod diameter is greater than said first piston rod diameter, said second piston rod ends having a front end and a back end, said second piston rod back end being attached to said guidance collar front surface, said third rod bring attached to said second piston rod front end, and a back-up ring, a piston end maintaining said first O-ring seal and said back-up ring in position with respect to said third rod, said assembly forming a second piston module, said second piston module being slidably received in said interior passage; and
  b. said piston retaining means body having an annular groove disposed therein and said annular groove intersecting said piston retaining means bore, said annular groove being sized to receive and receiving a second O-ring seal, said bore being sized to receive and receiving said first piston rod, said second O-ring seal being disposed around said first piston rod, said first piston rod being slidably retained within said bore, said piston retaining means being attached to said valve body such that said piston retaining means bottom closes said interior chamber, and said first piston rod second end extends through said piston retaining means top, said second O-ring seal preventing leakage of said inflation substance through said bore, said second piston module positioned within said interior passage between said chamber end wall and said outlet fitting to close said valve, said guidance collar front surface contacting said interior chamber end wall;
    whereby when a valve actuation means exerts a force effecting axial movement of said piston assembly and said second piston module is removed from said interior passage, the force from said pressurized container drives said piston assembly to said piston retaining means bottom, said inflation substance flows from said pressurized container through said valve body, and said guidance collar back surface contacts said piston retaining means bottom.

15. The valve as described in claim 14, wherein said valve body further comprises a plurality of means for receiving fittings.

16. The valve as described in claim 15, wherein said pressurizing means is a charging valve.

17. The valve as described in claim 16, wherein said inlet conduit further comprises threads for threaded engagement of said valve with said pressurized container.

18. The valve as described in claim 17, further comprising a pressure relief mechanism attached to said valve body and in communication with said interior chamber.

19. The valve as described in claim 18, wherein said outlet fitting bore further comprises an upper portion further having a means for receiving an outlet conduit.

20. The valve as described in claim 19, further comprising an outlet conduit having a first end, said first end received by said upper portion conduit receiving means, said first end in communication with said interior passage.

21. The valve as described in claim 20, wherein said interior passage is perpendicular to said inlet conduit.

22. The valve as described in claim 21, wherein said inlet conduit is perpendicular to said interior chamber.

23. The valve as described in claim 13, further comprising:
  a. a swivel having:
    (1) a first end, a shoulder, a tail, and a second end, said swivel containing a longitudinal bore therethrough;
    (2) a neck between said shoulder and said tail, said neck containing an opening therein, said opening sized to allow a valve actuation means to pass therethrough;
  b. said second piston rod diameter being less than said first piston rod diameter, wherein one of said second piston rod ends is a front surface, said piston assembly biased towards opening;
    said second piston rod being positioned between said first piston rod and said third rod, said third rod further having a front end, said front end distal from said second piston rod front surface;
    said first O-ring seal being disposed on said third rod between said front end and said second piston rod front surface; and
    said piston assembly further having an annular groove disposed on said first piston rod, said annular groove being sized to receive and receiving a second O-ring seal;

c. said piston retaining means bore being sized to receive and receiving said swivel, said swivel being rotatably received within said piston retaining means, said piston assembly being slidably and rotatably received within said swivel bore, said piston assembly second O-ring seal preventing leakage of said inflation substance between said piston assembly and said swivel, said piston retaining means being attached to said valve body such that said piston retaining means bottom closes said interior chamber, said swivel second end extending through said piston retaining means top, and said front end, said third rod, said piston assembly first O-ring seal and said second piston rod being positioned within said interior passage between said chamber end wall and said outlet fitting bore to close said valve, said first piston rod first end being in contact with said interior chamber; and d. said valve actuation receiving means being positioned on said first piston rod proximate said first piston rod second end, said valve actuation receiving means being sized to receive and receiving a valve actuation means, said valve actuation means being removable from said valve actuation receiving means regardless of the direction from which said valve actuation means is removed, such that when said valve actuation means is removed from said valve actuation receiving means, the force of said inflation substance effects axial movement of said piston assembly and said second piston rod is removed from said interior passage, said inflation substance flows from said pressurized container through said valve body, the force of said pressurized inflation substance driving said piston assembly through said swivel bore until said first piston rod is in contact with said swivel neck.

24. The valve as described in claim 23, further comprising a back-up ring positioned between said first O-ring seal and said front end.

25. The valve as described in claim 24, wherein said valve actuation receiving means in said first piston rod is a notch, said notch sized to receive and receiving the ball end of a ball and cable actuation means.

26. The valve as described in claim 25, wherein said swivel further comprises an annular groove proximate said first end, said annular groove being sized to receive and receiving an O-ring seal therein.

27. The valve as described in claim 26, wherein said swivel O-ring seal is positioned between said swivel and said piston retaining means.

28. The valve as described in claim 27, further comprising a pressure relief mechanism, said pressure relief mechanism being attached to said valve body.

29. The valve as described in claim 28, wherein said first piston rod second end further comprises an opening therein, said opening receiving a retrieval means.

30. A system for inflating an inflatable apparatus, the system comprising:
   a. a container of pressurized inflation substance;
   b. an inflatable apparatus;
   c. a valve for controlling the flow of said inflation substance from said pressurized container to said inflatable apparatus, said valve comprising:
      (1) a valve body having an inlet conduit, an interior chamber having a first end and an end wall, said inlet conduit communicating with said pressurized container and said interior chamber, said inlet conduit being perpendicular to said interior chamber;
      (2) an outlet fitting attached to said valve body, said outlet fitting having a body, a top and a bottom, said body having a bore therethrough, said bore having an upper portion and an interior passage, said interior passage in communication with said interior chamber proximate said interior chamber end wall, said upper portion having means for receiving an outlet conduit;
      (3) an outlet conduit having a first end and a second end, said first end received by said upper portion and in communication with said interior passage, said second end in communication with said inflatable apparatus, said outlet conduit being parallel with said interior chamber;
      (4) a swivel comprising:
         (a) a first end, a shoulder, a tail, and a second end, said swivel containing a longitudinal bore therethrough;
         (b) a neck between said shoulder and said tail, said neck containing an opening therein, said opening sized to allow a valve actuation means to pass therethrough;
      (5) a piston assembly comprising:
         (a) a first piston rod having a diameter, a first end and a second end;
         (b) a second piston rod having a diameter less than said first piston rod diameter, said second piston rod further having a front surface, said piston assembly biased towards opening;
         (c) a third rod or bar, said second piston rod positioned between said first piston rod and said third rod, said third rod further having a front end, said front end being distal from said second rod front surface;
         (d) a first O-ring seal disposed on said third rod between said front end and said second piston rod front surface;
         (e) an annular groove being disposed on said first piston rod, said annular groove being sized to receive and receiving a second O-ring seal;
      (6) a piston retaining means having a body, a top and a bottom, said body having a bore therethrough, said bore sized to receive and receiving said swivel, said swivel rotatably received within said piston retaining means; said piston assembly slidably and rotatably received within said swivel bore, said piston assembly second O-ring seal preventing leakage of said inflation substance between said piston assembly and said swivel, said piston retaining means attached to said valve body such that said piston retaining means bottom closes said interior chamber, said swivel second end extending through said piston retaining means top, and said front end, said third rod, said piston assembly first O-ring seal and said second piston rod are positioned within said interior passage between said chamber end wall and said outlet fitting bore to close said valve, said first piston rod first end in contact with said interior chamber;
      (7) a pressure relief mechanism, said pressure relief mechanism being attached to said valve body and in communication with said interior chamber; and
      (8) valve actuation receiving means on said first piston rod proximate said first piston rod second end, said valve actuation receiving means being sized to receive and receiving a valve actuation means, said valve actuation means being removable from said valve actuation receiving means regardless of the direction from which said valve actuation means is removed, such that when said valve actuation means is removed from said valve actuation receiving means, the force of said inflation substance effects axial movement of said piston assembly and said second piston rod is removed from said interior passage, said inflation substance flows from said pressurized container through said valve body, the force of said pressurized inflation substance driving said piston assembly through said swivel bore until said first piston rod is in contact with said swivel neck.

* * * * *